United States Patent
Hsu

(10) Patent No.: US 9,837,042 B2
(45) Date of Patent: Dec. 5, 2017

(54) PROJECTION SYSTEM WITH AUTO-PROJECT PORTABLE DEVICE FOR DISPLAYING IMAGES AUTOMATICALLY

(71) Applicant: ViewSonic International Corporation, New Taipei (TW)

(72) Inventor: Shih-Hung Hsu, Taipei (TW)

(73) Assignee: ViewSonic International Corporation, New Taipei (TW)

( * ) Notice: Subject to any disclaimer, the term of this patent is extended or adjusted under 35 U.S.C. 154(b) by 194 days.

(21) Appl. No.: 14/946,760

(22) Filed: Nov. 19, 2015

(65) Prior Publication Data

US 2017/0148414 A1    May 25, 2017

(51) Int. Cl.
| | |
|---|---|
| H04N 7/18 | (2006.01) |
| G09G 5/00 | (2006.01) |
| G06T 1/20 | (2006.01) |
| G06T 1/60 | (2006.01) |
| G09G 5/12 | (2006.01) |
| G06F 3/14 | (2006.01) |
| G09G 3/00 | (2006.01) |

(52) U.S. Cl.
CPC ............ *G09G 5/006* (2013.01); *G06F 3/1407* (2013.01); *G06T 1/20* (2013.01); *G06T 1/60* (2013.01); *G09G 3/002* (2013.01); *G09G 5/12* (2013.01); *G09G 2370/10* (2013.01); *G09G 2370/16* (2013.01)

(58) Field of Classification Search
CPC .......... G09G 5/006; G09G 3/002; G09G 5/12; G09G 2370/10; G09G 2370/16; G06F 3/1407; G06T 1/20; G06T 1/60
See application file for complete search history.

(56) References Cited

U.S. PATENT DOCUMENTS

| | | | | |
|---|---|---|---|---|
| 2009/0259515 | A1* | 10/2009 | Belimpasakis | G06Q 30/02 709/218 |
| 2009/0287794 | A1* | 11/2009 | Saaranen | H04L 12/2812 709/219 |
| 2010/0005150 | A1 | 1/2010 | Kubota | |
| 2012/0083244 | A1* | 4/2012 | Verthein | H04M 1/72533 455/411 |

(Continued)

OTHER PUBLICATIONS

Fully understand Intel WiDi, Mengkuei Hsu, pp. 1-5, Sep. 23, 2011, http://www.techbang.com/posts/6985-hardware-intel-widi-wireless-hall-a-large-vision-xu-mengkui-15-and-then-on.

(Continued)

*Primary Examiner* — Oleg Asanbayev
(74) *Attorney, Agent, or Firm* — Winston Hsu

(57) ABSTRACT

A projection system includes a display device, a wireless presentation gateway, a computer terminal, and a portable device. The display device is used for displaying an image. The wireless presentation gateway is linked to the display device for transmitting image data to the display device. The computer terminal is linked to the wireless presentation gateway for transmitting the image data to the wireless presentation gateway. The portable device is connected to the computer terminal through a communication port for driving the computer terminal, the wireless presentation gateway, and the display device for performing an image display process automatically.

3 Claims, 9 Drawing Sheets

(56) References Cited

U.S. PATENT DOCUMENTS

2014/0143298 A1\* 5/2014 Klotzer .............. H04L 67/2823
709/203
2014/0373040 A1\* 12/2014 Lin .................... H04N 21/4126
725/25

OTHER PUBLICATIONS

Best WIFI to Android automatically connected to the strong signal AP, Brain, Oct. 22, 2014, https://briian.com/24149/best-wifi.html.
Export or import your wireless network profile, Proud-laugh-Red-Road, Nov. 12, 2011, http://www.lijyyh.com/2011/11/blog-post_12.html.
How to back up your wireless network settings, Bora's red sunflower seeds, Feb. 4, 2007, http://blog.xuite.net/baolaibox/twblog/146587215-%E5%A6%82%E4%BD%95%E6%8A%8A%E7%84%A1%E7%B7%9A%E7%B6%B2%E8%B7%AF%E8%A8%AD%E5%AE%9A%E5%82%99%E4%BB%BD%E8%B5%B7%E4%BE%86.

\* cited by examiner

# PROJECTION SYSTEM WITH AUTO-PROJECT PORTABLE DEVICE FOR DISPLAYING IMAGES AUTOMATICALLY

BACKGROUND OF THE INVENTION

1. Field of the Invention

The present invention illustrates a projection system, and more particularly, a projection system with an auto-project portable device for displaying images automatically.

2. Description of the Prior Art

With the advancement of techniques, various types of projectors, screens, and monitors are adopted for image display. For example, a projector is used widely in a presentation of a conference since the projector can enlarge an original image. Specifically, a network projector can project an image stored in a hard disk from a computer through a wireless link. Generally, before the projector projects the image, the wireless link between the computer and the projector must be established first. In practice, several link protocols can be used for link establishment, such as Wireless Fidelity (Wi-Fi) protocol.

For conventional network projectors, in order to establish a wireless link for transmitting image data with high security, high reliability, and interference-free, several Steps are essentially required. First, a user has to download specific software associated to drive a Wi-Fi module of the computer (or drive/identify gateway device). Second, the specific software is required to be installed into the computer. Third, when the computer detects several access points, the user has to select an appropriate access point or change a default access point to establish a user-defined Wi-Fi link between computer and the projector. After establishing a Wi-Fi link between the computer and the projector, the user may further input a login code to request a permission of data transmission through the Wi-Fi link. Next, the user may press a "play" key of an interface generated by the software to start image data transmission. Finally, the projector receives the image data and projects the image data.

Although the projector can project the image data from the computer through the wireless link, it lacks of operation convenience since several Steps have to be processed manually by the user. In other words, the aforementioned operation for projecting the image data by the projector is complicate and inconvenient. All configurations defined by the user are not stored in the computer, thereby leading to low operation efficiency.

SUMMARY OF THE INVENTION

In an embodiment of the present invention, a projection system is disclosed. The projection system includes a display device, a wireless presentation gateway, a computer terminal, and a portable device. The display device is configured to display an image. The wireless presentation gateway is linked to the display device and is configured to transmit image data to the display device. The computer terminal is linked to the wireless presentation gateway and is configured to transmit the image data to the wireless presentation gateway. The portable device is connected to the computer terminal through a communication port and is configured to drive the computer terminal, the wireless presentation gateway, and the display device for performing an image display process automatically.

Another embodiment of the present invention discloses a method for controlling a projection system. The method includes connecting a portable device to a computer terminal, displaying a wireless pairing interface provided by the portable device on the computer terminal, inputting router identifier information corresponding to a selected router to the wireless pairing interface, storing link configurations generated according to the router identifier information in the portable device, establishing a link between the computer terminal and the router according to the link configurations, transmitting image data from the computer terminal to the router, and transmitting the image data from the router to a display device through a wireless presentation gateway.

Another embodiment of the present invention discloses a method for controlling a projection system. The method includes connecting a portable device to a computer terminal, displaying a wireless pairing interface provided by the portable device on the computer terminal, inputting identifier information corresponding to a selected wireless presentation gateway to the wireless pairing interface, storing link configurations generated according to the identifier information in the portable device, establishing a link between the computer terminal and the wireless presentation gateway according to the link configurations, transmitting image data from the computer terminal to the wireless presentation gateway, and transmitting the image data from the wireless presentation gateway to a display device.

Another embodiment of the present invention discloses a method for controlling a projection system. The method includes connecting a portable device to a computer terminal, acquiring a wireless presentation gateway list from an interface, selecting a wireless presentation gateway from the wireless presentation gateway list, establishing a link between the computer terminal and the selected wireless presentation gateway according to link configurations of the selected wireless presentation gateway, transmitting image data from the computer terminal to the selected wireless presentation gateway, and transmitting the image data from the selected wireless presentation gateway to a display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
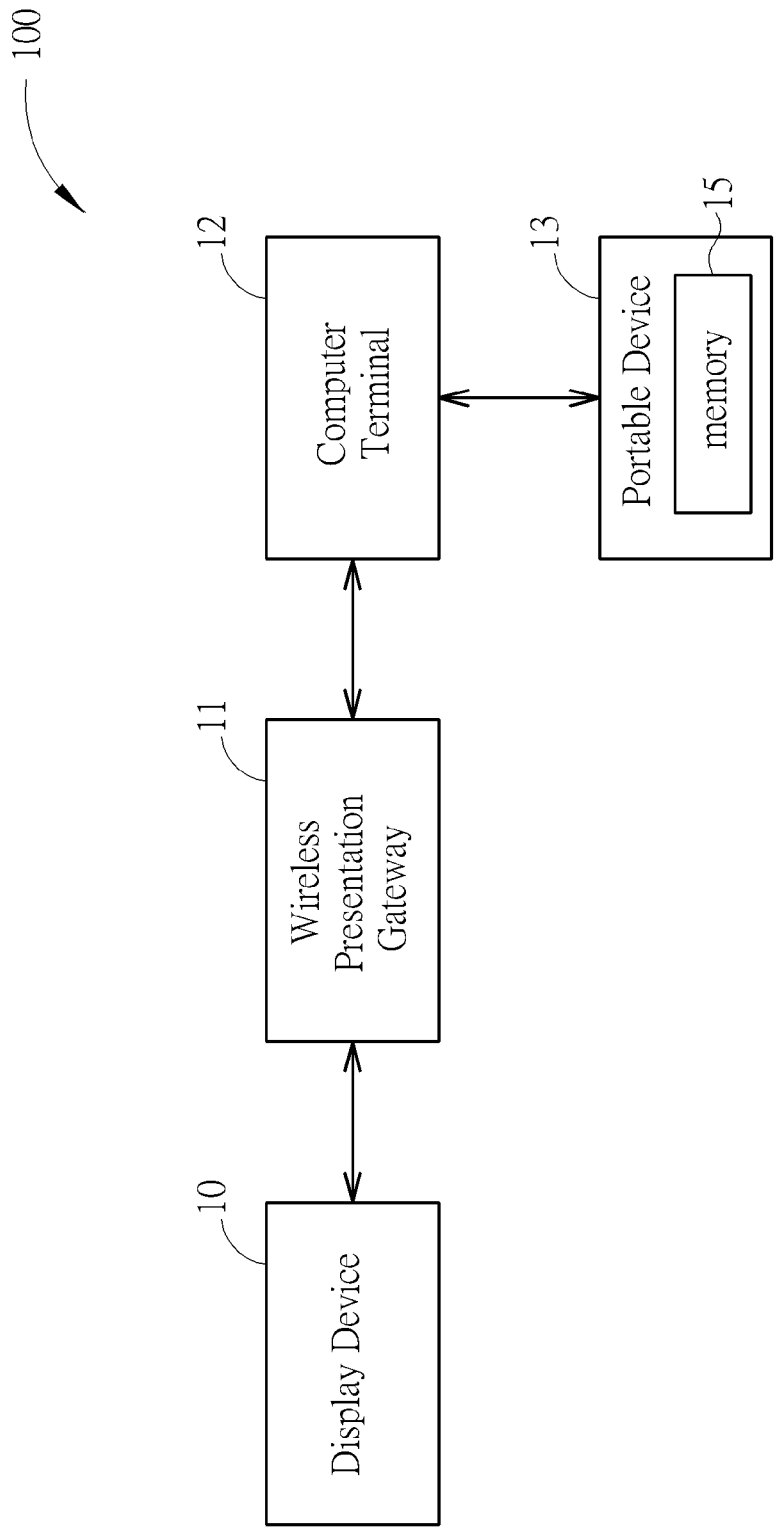
FIG. 1 illustrates a block diagram of a projection system according to an embodiment of the present invention.

FIG. 1 illustrates a block diagram of a projection system 100. The projection system 100 can include a display device 10, a wireless presentation gateway 11, a computer terminal 12, and a portable device 13. The display device 10 can be a monitor, a projector, or any type of display screen for displaying an image. A wireless presentation gateway 11 can be any type of wireless media sharing devices. For example, the wireless presentation gateway 11 can be a wireless media sharing device capable of wireless communications. In the projection system 100, the wireless presentation gateway 11 is linked to the display device 10 for transmitting image data to the display device 10. The computer terminal 12 is linked to the wireless presentation gateway 11 for transmitting the image data to the wireless presentation gateway 11. Here, the computer terminal 12 can be a personal computer (PC), a notebook, a tablet, or a work station. The portable device 13 is connected to the computer terminal 12 through a communication port. In the embodiment, the portable device 13 can be a universal serial bus (USB) device (or say, portable flash drive). The portable device 13 has a memory 15 for storing driving data. Particularly, the communication port can be a USB port. However, the present embodiment is not limited to use the USB device to connect to the computer terminal 12 through the USB port. For example, the portable device 13 can be a micro-USB device or a mini-USB device. The communication port can be a micro-USB port or a mini-USB port. In this embodiment, the link between the display device 10 and the wireless presentation gateway 11, and the link between the wireless presentation gateway 11 and the computer terminal 12 can be established by using Wireless Fidelity (Wi-Fi) protocols. Since the wireless presentation gateway 11 can connect to the computer terminal 12 without using any intermediate device (i.e., router or relay), the link between wireless presentation gateway 11 and the computer terminal 12 can be regarded as a Wi-Fi direct link. The wireless presentation gateway 11 can function in an access point (AP) mode which can broadcasts a Wi-Fi recognition signal within a Wi-Fi coverage. In the embodiment, the wireless presentation gateway 11 and the portable device 13 are pair-wised devices under Wi-Fi direct link. In other words, default link configurations of the wireless presentation gateway 11 are pre-stored in the portable device 13 before the user connects the portable device 13 to the computer terminal 12. When the portable device 13 and the computer terminal 12 are connected, the link between wireless presentation gateway 11 and the computer terminal 12 can be established automatically. Then, the computer terminal 12, the wireless presentation gateway 11, and the display device 10 can be driven to perform an image display process automatically.

Without loss of generality, when a user intends to use another wireless presentation gateway (i.e., different from wireless presentation gateway 11), the user has to reconfigure information of a selected wireless presentation gateway by a Wi-Fi pairing interface for establishing a non-default Wi-Fi direct link. The Wi-Fi pairing interface and the corresponding pairing process will be illustrated later.

Figure 2:
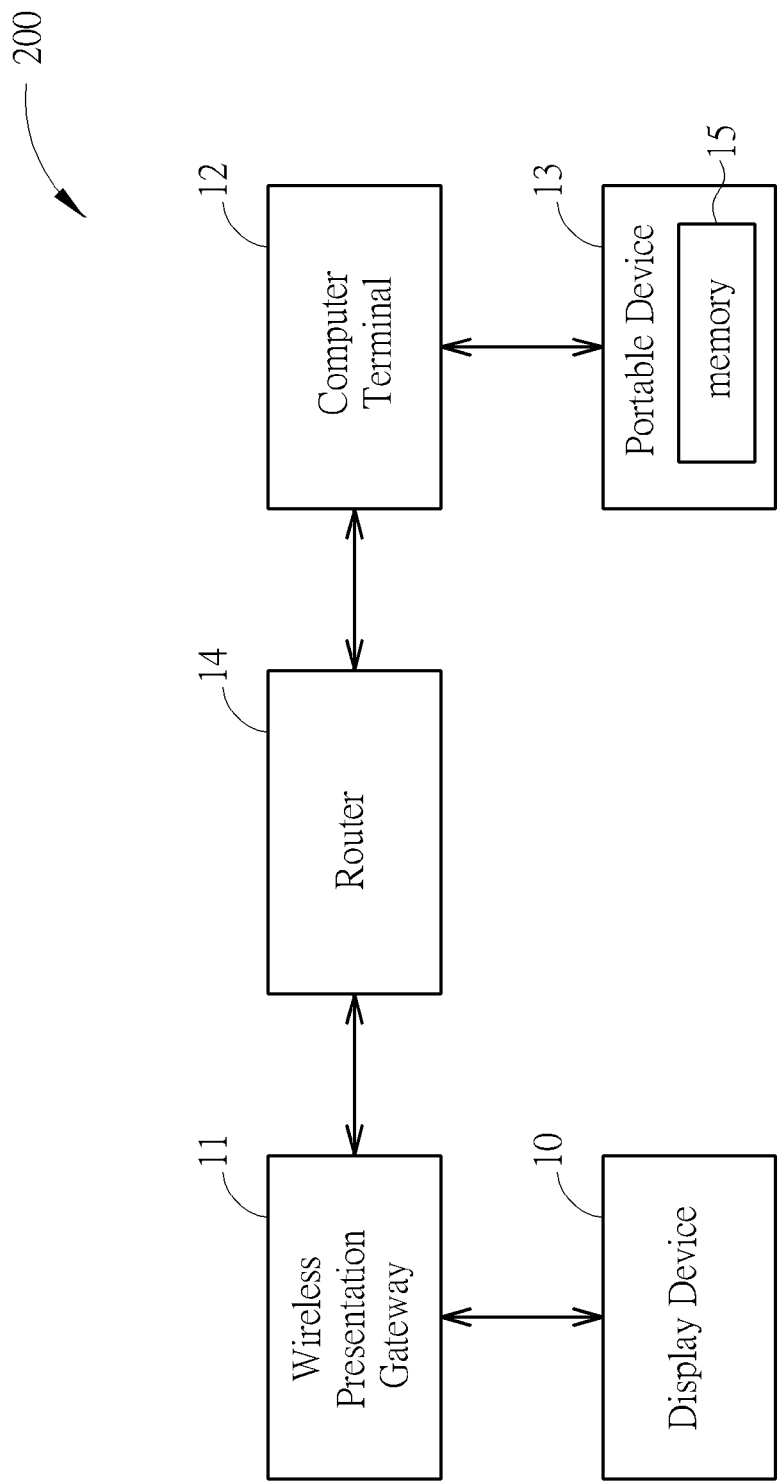
FIG. 2 illustrates a block diagram of a projection system according to another embodiment of the present invention.

FIG. 2 illustrates a block diagram of a projection system 200. The projection system 200 can include a display device 10, a wireless presentation gateway 11, a computer terminal 12, a portable device 13, and a router 14. In the projection system 200, the wireless presentation gateway 11 is linked to the display device 10 for transmitting image data to the display device 10. The router 14 is linked to the wireless presentation gateway 11. The computer terminal 12 is linked to the router 14 for transmitting the image data to the wireless presentation gateway 11 through the router 14. The router 14 can be an internet protocol (IP) router, a network relay node, or a network switch device. In this embodiment, the link between display device 10 and wireless presentation gateway 11, the link between wireless presentation gateway 11 and the router 14, and the link between the router 14 and the computer terminal 12 can be established by using Wireless Fidelity (Wi-Fi) protocols. Since the projection system 100 introduces the router 14 for image data transmission, the wireless presentation gateway 11 can function in a server mode which only receives the image data from the router 14 and transmits a response signal back to the router 14. In the embodiment, since the router 14 is introduced to the projection system 200 instead of using the default Wi-Fi direct mechanism, the user has to set information of the router 14 to establish a router-based wireless link when the portable device 13 and the computer terminal 12 are connected. After the router-based wireless link is established, the computer terminal 12, the wireless presentation gateway 11, and the display device 10 can be driven to perform an image display process automatically.

Figure 3:
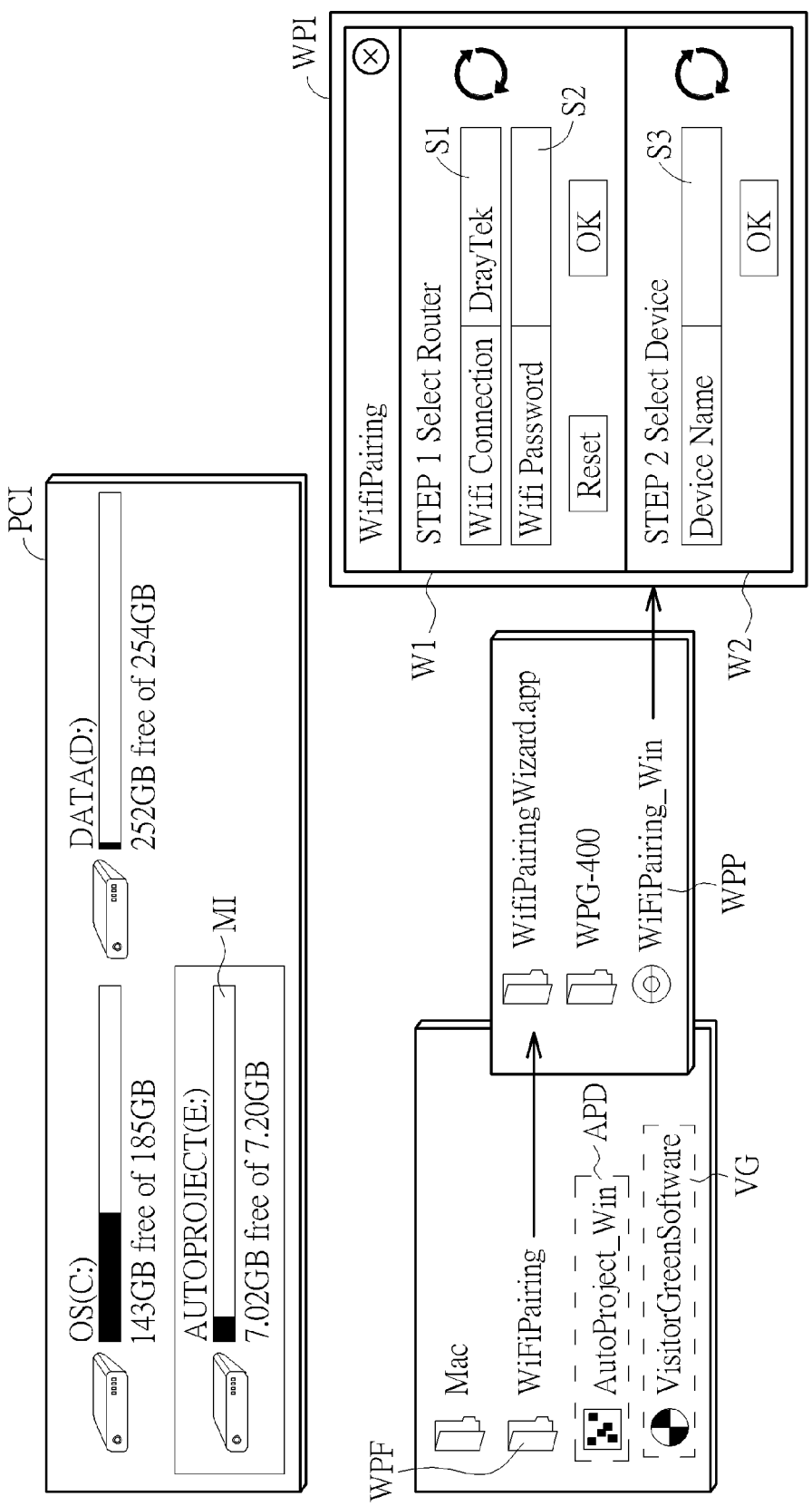
FIG. 3 illustrates interfaces displayed by a computer terminal of the projection system of the present invention.

FIG. 3 illustrates interfaces displayed by a computer terminal 12 of the projection system 100 or 200. The interfaces can be displayed on the screen of the computer terminal 12 manually after the portable device 13 is connected to the computer terminal 12. Specifically, since the portable device 13 includes a memory 15 with predetermined capacity, an interface PCI of the computer terminal 12 can display a window MI with respect to the memory utilization of the portable device 13. The memory 15 of the portable device 13 includes driving data, which includes several data folders and executable file/programs, as illustrated below. In the embodiment, the memory 15 of the portable device 13 includes at least 3 files, such as a Wi-Fi pairing folder WPF (denoted as "WiFiPairing" in FIG. 3), an auto-project detector program APD (denoted as "AutoProject_Win" in FIG. 3), a visitor green program VG (denoted as "VisitorGreenSoftware" in FIG. 3). The Wi-Fi pairing folder WPF includes some driving data of a Wi-Fi pairing executable program WPP (denoted as "WiFiPairing_Win" in FIG. 3) for establishing a wireless link. Specifically, the Wi-Fi pairing executable program WPP generates a Wi-Fi pairing interface WPI. The Wi-Fi pairing interface WPI can include a first window W1 and a second window W2. The first window W1 includes a first subwindow S1 for inputting Wi-Fi connection device identifier information, and a second subwindow S2 for inputting a Wi-Fi password. The second window W2 includes a third subwindow S3 for inputting wireless presentation gateway identifier information. For example, when the user intends to use another wireless presentation gateway (i.e., different from default-paired wireless presentation gateway) to establish a Wi-Fi direct link (i.e., the selected wireless presentation gateway is operated under AP mode), identifier information corresponding to the selected wireless presentation gateway (i.e., for example, WPG400) is inputted to the first subwindow S1. A Wi-Fi password is inputted to the second subwindow S2. The identifier information corresponding to the selected wireless presentation gateway (i.e., for example, WPG400) is also inputted to the third subwindow S3.

When the user intends to establish the router-based wireless link (i.e., the selected wireless presentation gateway is operated under server mode), identifier information corresponding to a selected router (i.e., for example, DrayTek) is inputted to the first subwindow S1. A Wi-Fi password is inputted to the second subwindow S2. The identifier information corresponding to the selected wireless presentation gateway (i.e., for example, WPG400) is inputted to the third subwindow S3. Specifically, the third subwindow S3 can be a blank window if the selected router has already established a wireless link to the selected wireless presentation gateway.

After the Wi-Fi direct-based wireless link or a router-based wireless link is established. Two operation options are provided in the projection system 100 or the projection system 200. In the first operation option, the user can install the auto-project detector program APD in FIG. 3 into the computer terminal 12. After the auto-project detector program APD is installed into the computer terminal 12, the auto-project detector program APD can identify the portable device 13. Then, the portable device 13 can drive the computer terminal 12, the wireless presentation gateway 11, and the display device 10 to perform an image display process automatically. Specifically, for the next use of portable device 13, when the portable device 13 is connected to the computer terminal 12 again, a wireless link can be automatically established according to preconfigured link configurations (Wi-Fi direct-based wireless link or router-based wireless link). Then, the image display process can be performed automatically. In the second operation option, the user can execute the visitor green program VG in FIG. 3. After the visitor green program VG is executed, the portable device 13 can drive the computer terminal 12, the wireless presentation gateway 11, and the display device 10 to perform an image display process automatically. Specifically, for the next use of portable device 13, when the portable device 13 is connected to the computer terminal 12 again, a wireless link can be established according to preconfigured link configurations (Wi-Fi direct-based wireless link or router-based wireless link) after the visitor green program VG is executed again. In other words, the image display process can be performed automatically after the auto-project detector program APD is installed since the auto-project detector program APD is a non-zero footprint program. The image display process can be performed manually after the visitor green program VG is executed since the visitor green program VG is a zero-footprint program. For presentation completeness, a process for establishing wireless link (i.e., including Wi-Fi direct-based wireless link or router-based wireless link) in conjunction with a process for displaying image is illustrated in below.

Figure 4:
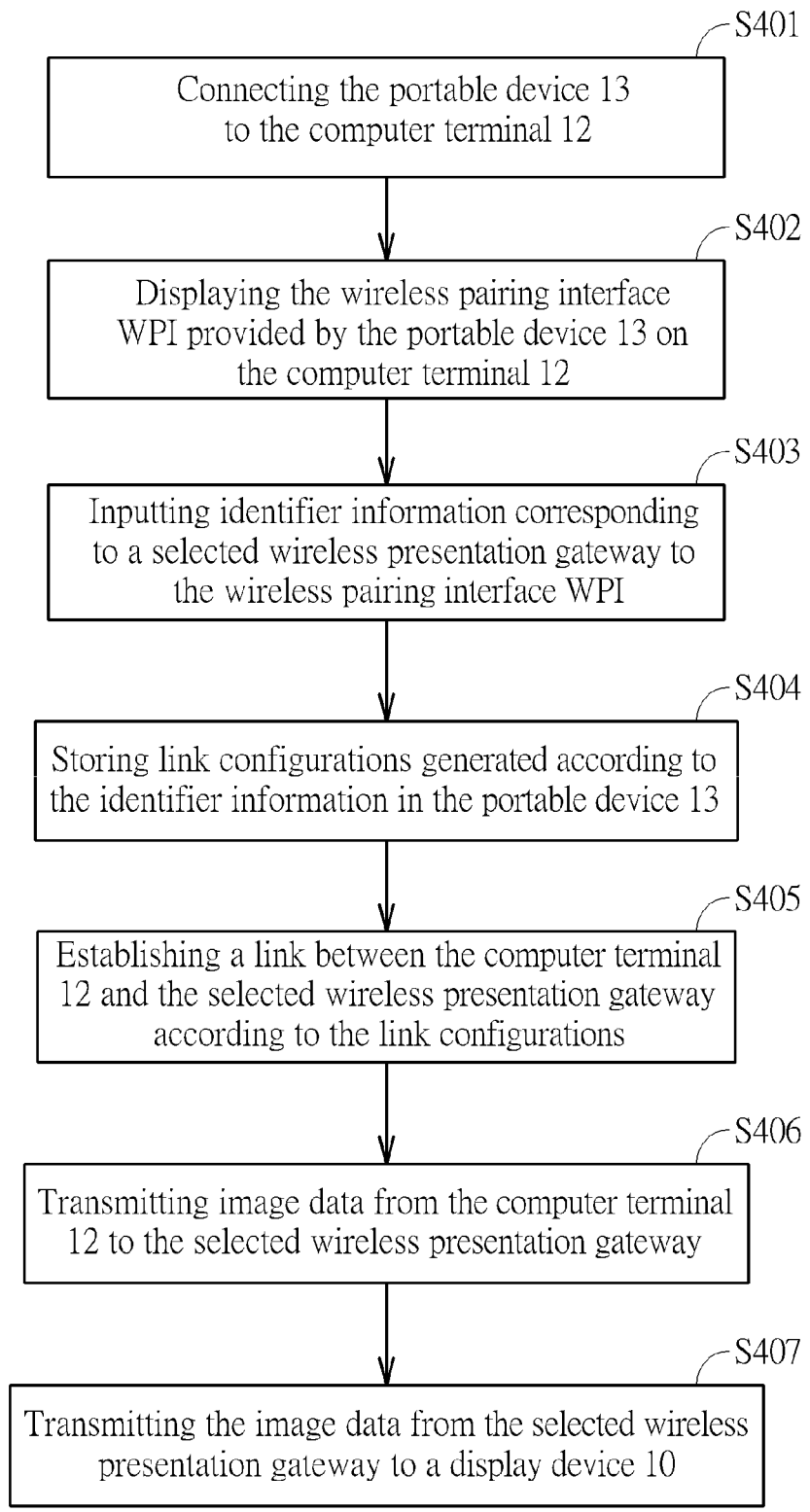
FIG. 4 illustrates a presetting flow chart of the method for controlling the projection system in FIG. 1 without using default Wi-Fi direct pairing configuration.

FIG. 4 illustrates a presetting flow chart of the method for controlling the projection system 100 without using a default Wi-Fi direct pairing configuration. The method includes but is not limited to the following Step S401 to Step S407, as described below.

Step S401: connecting the portable device 13 to the computer terminal 12;
Step S402: displaying the wireless pairing interface WPI provided by the portable device 13 on the computer terminal 12;
Step S403: inputting identifier information corresponding to a selected wireless presentation gateway to the wireless pairing interface WPI;
Step S404: storing link configurations generated according to the identifier information in the portable device 13;
Step S405: establishing a link between the computer terminal 12 and the selected wireless presentation gateway according to the link configurations;
Step S406: transmitting image data from the computer terminal 12 to the selected wireless presentation gateway;
Step S407: transmitting the image data from the selected wireless presentation gateway to a display device 10.

Since the process for establishing a wireless link without using a default Wi-Fi direct pairing configuration is illustrated in FIG. 3, the method for controlling the projection system 100 is illustrated correspondingly. In Step S401, the portable device 13 is connected to the computer terminal 12 through the USB port by a user. When the user intends to establish the wireless link (Wi-Fi direct) without using default Wi-Fi direct pairing configuration, in Step S402, the user manually opens the wireless pairing interface WPI provided by the portable device 13 on the computer terminal 12. In Step S403, the user inputs identifier information corresponding to the selected wireless presentation gateway to the wireless pairing interface WPI. As aforementioned, the identifier information can be exemplified as the device name "WPG400" of the selected wireless presentation gateway. After the identifier information corresponding to the selected wireless presentation gateway is inputted and confirmed, the portable device 13 stores link configurations generated according to the identifier information in Step S404. For example, the portable device 13 stores all packet transmission configurations, characteristics and network parameters corresponding to the selected wireless presentation gateway into the memory 15. In the following, the computer terminal 12 establishes the link to the selected wireless presentation gateway according to the link configurations in Step S405. After the link is established, the computer terminal 12 transmits image data to the selected wireless presentation gateway in Step S406. After the selected wireless presentation gateway receives the image data, the selected wireless presentation gateway transmits the image data to the display device 10 in Step S407 for displaying image.

Figure 5:
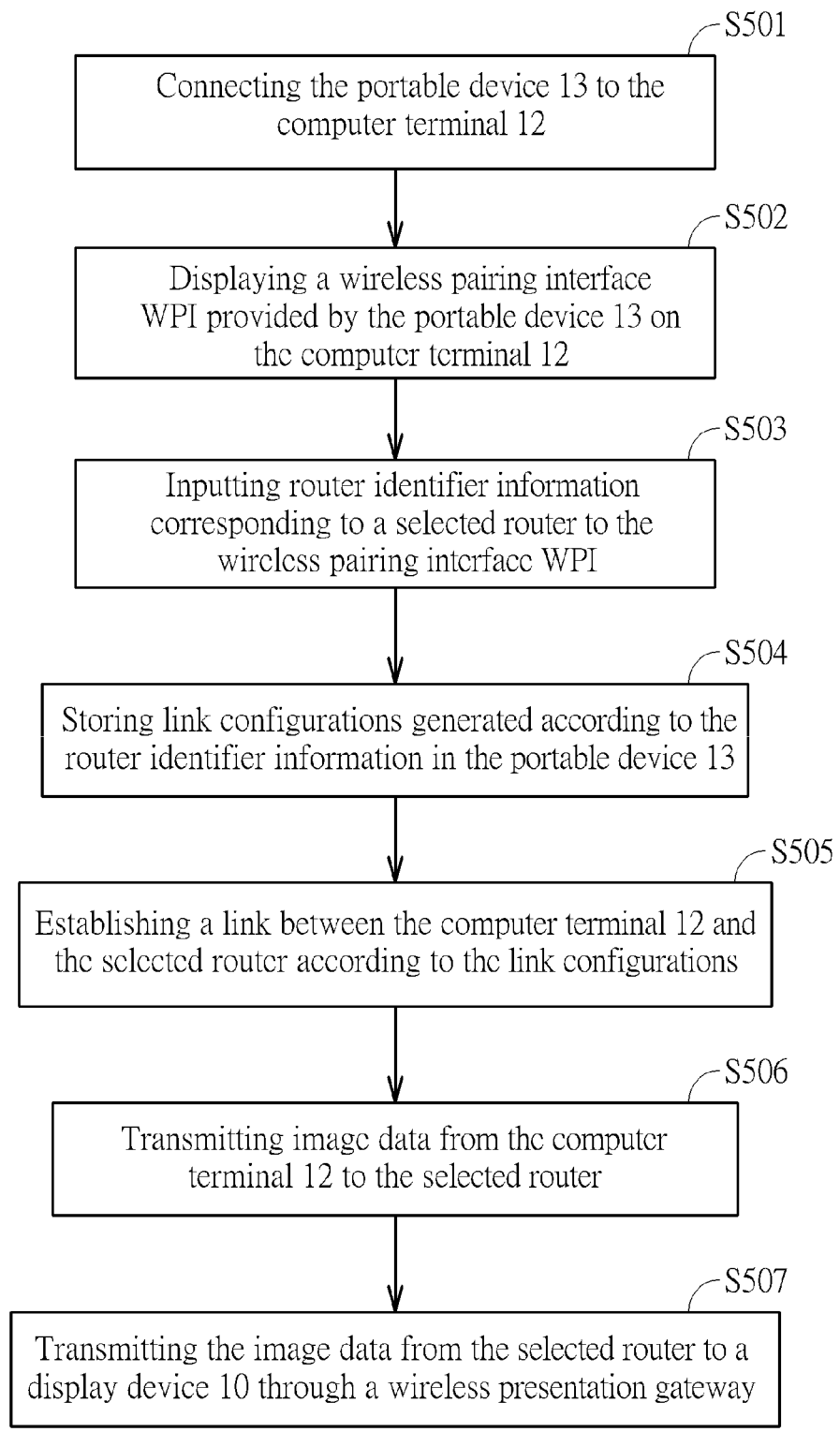
FIG. 5 illustrates a presetting flow chart of the method for controlling the projection system by using router configuration in FIG. 2.

FIG. 5 illustrates a presetting flow chart of the method for controlling the projection system 200 using router configuration. The method includes but is not limited to the following Step S501 to Step S507, as described below.

Step S501: connecting the portable device 13 to the computer terminal 12;
Step S502: displaying a wireless pairing interface WPI provided by the portable device 13 on the computer terminal 12;
Step S503: inputting router identifier information corresponding to a selected router to the wireless pairing interface WPI;
Step S504: storing link configurations generated according to the router identifier information in the portable device 13;
Step S505: establishing a link between the computer terminal 12 and the selected router according to the link configurations;
Step S506: transmitting image data from the computer terminal 12 to the selected router;
Step S507: transmitting the image data from the selected router to a display device 10 through a wireless presentation gateway.

Since the process for establishing a wireless link by using the selected router configuration is illustrated in FIG. 3, the method for controlling the projection system 200 is illustrated correspondingly. In Step S501, the portable device 13 is connected to the computer terminal 12 through the USB port by a user. When the user intends to establish the wireless link by using the selected router, in Step S502, the user manually opens the wireless pairing interface WPI provided by the portable device 13 on the computer terminal 12. In Step S503, the user inputs identifier information corresponding to the selected router to the wireless pairing interface WPI. As aforementioned, the identifier information can be exemplified as the router name "DrayTek" of the selected router. After the identifier information corresponding to the selected router is inputted and confirmed, the portable device 13 stores link configurations generated according to the identifier information in Step S504. For example, the portable device 13 stores all packet transmission configurations, characteristics and network parameters corresponding to the selected router into the memory 15. Afterwards the computer terminal 12 establishes the link to the selected router according to the link configurations in Step S505. After the link is established, the computer terminal 12 transmits image data to the selected router in Step S506. After the selected router receives the image data, the selected router transmits the image data to the display device 10 through a wireless presentation gateway.

Figure 6:
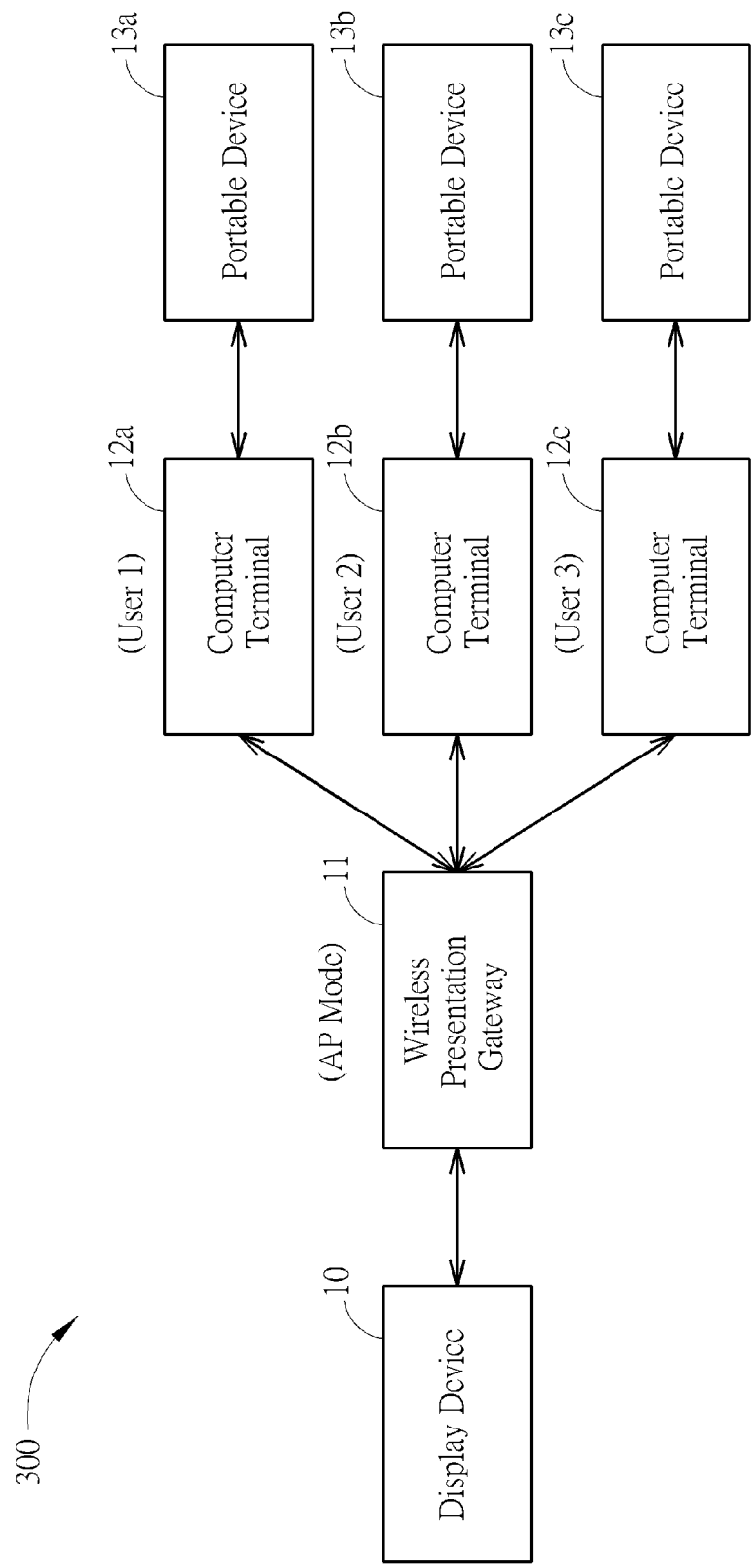
FIG. 6 illustrates a block diagram of a projection system according to another embodiment of the present invention.

FIG. 6 illustrates a block diagram of a projection system 300. For presentation simplicity, 3 computer terminals 12a to 12c and 3 portable devices 13a to 13c are introduced. In the projection system 300, a wireless presentation gateway 11 in an AP mode is linked to the computer terminal 12a, the computer terminal 12b, and the computer terminal 12c based on Wi-Fi direct protocols. The computer terminal 12a and a portable device 13a are connected. The computer terminal 12b and a portable device 13b are connected. The computer terminal 12c and a portable device 13c are connected. Three computer terminals 12a to 12c can be operated by different users. Specifically, a wireless link between the computer terminal 12a and the wireless presentation gateway 11 is established first. The wireless link between the computer terminal 12b and the wireless presentation gateway 11 is established afterwards. The wireless link between the computer terminal 12c and the wireless presentation gateway 11 is established last. Consider the image display process can be automatically executed after each portable device is connected to the corresponding computer terminal. When the computer terminal 12a transmits image data to the display device 10 for displaying images, the computer terminal 12b and the computer terminal 12c are on hold and cannot transmit image data since bandwidth of the wireless presentation gateway 11 is currently occupied by the computer terminal 12a. After the computer terminal 12a completes image data transmission, the computer terminal 12b can start to transmit image data to the display device 10 for displaying images. Similarly, when the computer terminal 12b transmits image data to the display device 10 for displaying images, the computer terminal 12c is on hold and cannot transmit image data since bandwidth of the wireless presentation gateway 11 is currently occupied by the computer terminal 12b. After the computer terminal 12b completes image data transmission, the computer terminal 12c can start to transmit image data to the display device 10 for displaying images. Briefly, in the projection system 300, when multi-computer terminals are linked to the wireless presentation gateway 11 in AP mode, the display device 10 can sequentially display images according to a sequence of link establishment from multi-computer terminals.

Figure 7:
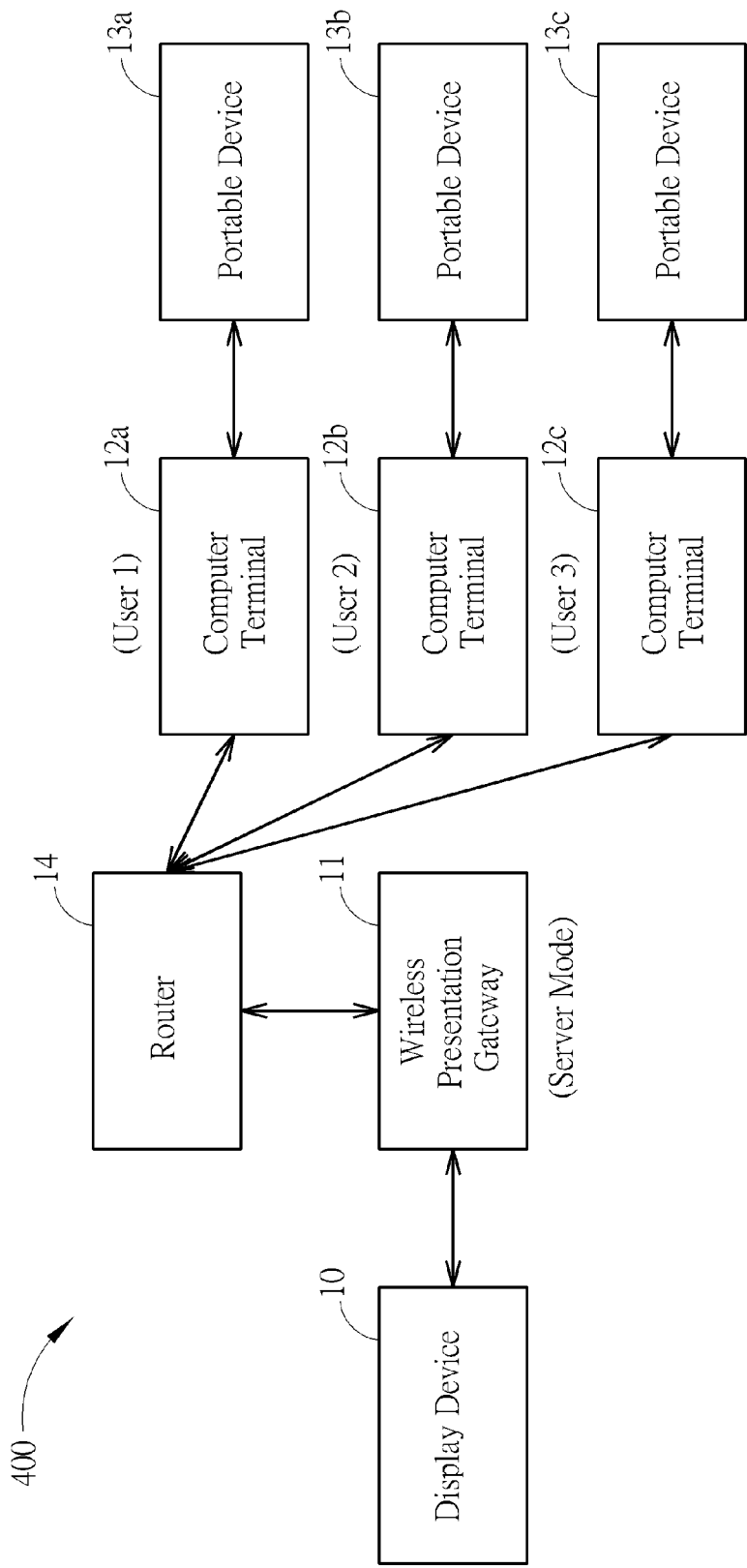
FIG. 7 illustrates a block diagram of a projection system according to another embodiment of the present invention.

FIG. 7 illustrates a block diagram of a projection system 400. For presentation simplicity, 3 computer terminals 12a to 12c and 3 portable devices 13a to 13c are introduced. In the projection system 400, a wireless presentation gateway 11 in a server mode is linked to the router 14. The router 14 is linked to the computer terminal 12a, the computer terminal 12b, and the computer terminal 12c. The computer terminal 12a and a portable device 13a are connected. The computer terminal 12b and a portable device 13b are connected. The computer terminal 12c and a portable device 13c are connected. Three computer terminals 12a to 12c can be operated by different users. Specifically, a wireless auto link between the computer terminal 12a and the router 14 is established first. The wireless auto link between the computer terminal 12b and the router 14 is established afterwards. The wireless auto link between the computer terminal 12c and the router 14 is established last. Consider the image display process can be automatically executed after each portable device is connected to the corresponding computer terminal. When the computer terminal 12a transmits image data to the display device 10 through the router 14 and the wireless presentation gateway 11 for displaying images, the computer terminal 12b and the computer terminal 12c are on hold and cannot transmit image data since bandwidths of the router 14 and the wireless presentation gateway 11 are currently occupied by the computer terminal 12a. After the computer terminal 12a completes image data transmission, the computer terminal 12b can start to transmit image data to the display device 10 for displaying images. Similarly, when the computer terminal 12b transmits image data to the display device 10 for displaying images, the computer terminal 12c is on hold and cannot transmit image data since bandwidths of the router 14 and the wireless presentation gateway 11 is currently occupied by the computer terminal 12b. After the computer terminal 12b completes image data transmission, the computer terminal 12c can start to transmit image data to the display device 10 for the displaying image. Briefly, in the projection system 400, when multi-computer terminals are linked to the router 14, the display device 10 can sequentially display images according to a sequence of link establishment from multi-computer terminals.

Figure 8:
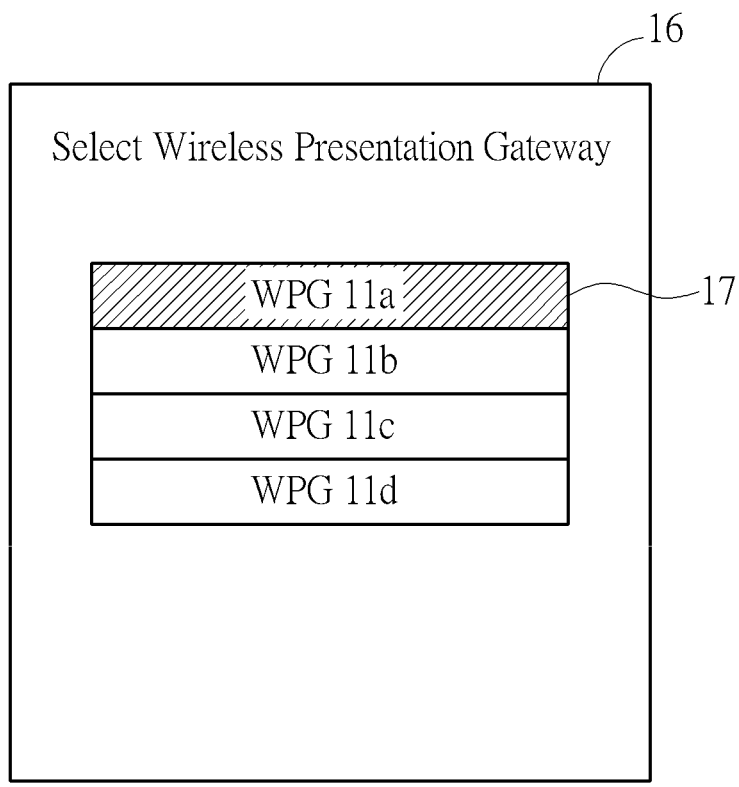
FIG. 8 illustrates a wireless presentation gateway list of projection system of the present invention.

FIG. 8 illustrates a wireless presentation gateway list 17 of the projection system in the present invention. Instead of using default-paired wireless presentation gateway for establishing a Wi-Fi direct link automatically, or using a selected wireless presentation gateway or router to establish wireless link manually, a wireless presentation gateway list 17 can be applied to the projection system 100 or 200, even can be applied to the projection system 300 or 400. Here, the wireless presentation gateway list 17 can be displayed from an interface 16 after the portable device 13 is connected to the computer terminal 12. Specifically, the wireless presentation gateway list 17 can comprise a plurality of wireless presentation gateways currently available within a coverage of network domain, or the wireless presentation gateway list 17 can comprise a plurality of wireless presentation gateways located nearby the computer terminal 12 and being identifiable by the computer terminal 12, or the wireless presentation gateway list 17 can comprise a plurality of wireless presentation gateways having been paired aforehand. In FIG. 8, the wireless presentation gateway list 17 comprises 4 wireless presentation gateways WPG11a, WPG11b, WPG11c and WPG11d. The user can select one of the wireless presentation gateways shown on the wireless presentation gateway list 17. For example, the user can select a wireless presentation gateway WPG11a to establish a wireless link. After the wireless presentation gateway WPG11a is selected, the wireless link (i.e., a link between wireless presentation gateway WPG11a and the computer terminal or a link between a router connected by the wireless presentation gateway WPG11a and the computer terminal) can be automatically established. Then, the image display process can be performed automatically.

Figure 9:
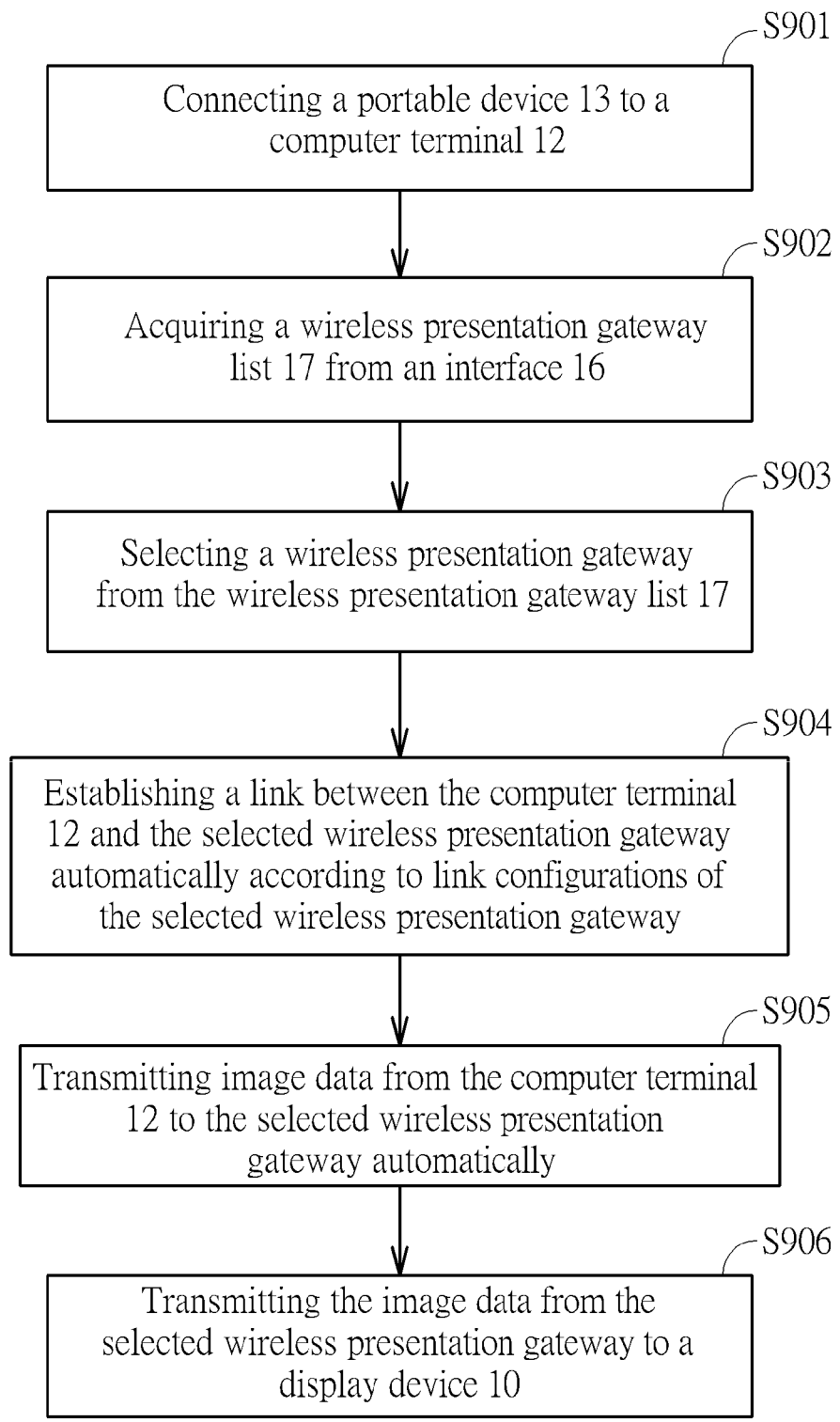
FIG. 9 illustrates a flow chart of the method for controlling the projection system according to the wireless presentation gateway list in FIG. 8.

FIG. 9 illustrates a flow chart of the method for controlling a projection system 100 or 200 according to the wireless presentation gateway list 17. The method includes but is not limited to the following Step S901 to Step S906, as described below.

Step S901: connecting a portable device 13 to a computer terminal 12;

Step S902: acquiring a wireless presentation gateway list 17 from an interface 16;

Step S903: selecting a wireless presentation gateway from the wireless presentation gateway list 17;

Step S904: establishing a link between the computer terminal 12 and the selected wireless presentation gateway automatically according to link configurations of the selected wireless presentation gateway;

Step S905: transmitting image data from the computer terminal 12 to the selected wireless presentation gateway automatically;

Step S906: transmitting the image data from the selected wireless presentation gateway to a display device 10.

Similar to aforementioned method for controlling a projection system 100 or 200, first, in Step S901, the portable device 13 is connected to the computer terminal 12 through the USB port by a user. Then, in Step S902, the wireless presentation gateway list 17 is generated and is shown on the interface 16 after the portable device 13 and the computer terminal are connected. In Step S903, the user selects a wireless presentation gateway (i.e., for example, a wireless presentation gateway WPG11a in FIG. 8) from the wireless presentation gateway list 17. After a wireless presentation gateway is selected, a link between the computer terminal 12 and the selected wireless presentation gateway can be established automatically according to link configurations of the selected wireless presentation gateway in Step S904. After the link is established automatically, the computer terminal 12 transmits image data to the selected wireless presentation gateway automatically in Step S905. After the selected wireless presentation gateway receives the image data, the selected wireless presentation gateway transmits the image data to the display device 10 in Step S906 for displaying images. Specifically, in Step S903, if the wireless presentation gateway preconfigured to connect to a router is selected and the user intends to use a router-based link for image display, after a link between the selected wireless presentation gateway and the computer terminal 12 through the router is established in Step S904, the computer terminal 12 transmits image data to the selected wireless presentation gateway in Step S905 through the router. Finally, after the selected wireless presentation gateway receives the image data, the selected wireless presentation gateway transmits the image data to the display device 10 in Step S906 for displaying images.

To sum up, the present invention discloses a projection system. The projection system has a portable device with auto-project capability which includes default link configurations and can store all modified link configurations. By using default link configurations or modified link configurations, the computer terminal can establish a wireless link to the wireless presentation gateway or can establish a wireless link to the wireless presentation through a router after the portable device and the computer terminal are connected. Further, the image data can be transmitted from the computer terminal to the display device for displaying image automatically. Thus, the projection system of the present embodiments has high operation convenience and high operation efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection system, comprising:
a display device configured to display an image;
a wireless presentation gateway linked to the display device and configured to transmit image data to the display device, the wireless presentation gateway having dual band configured to establish a wireless link;
a computer terminal linked to the wireless presentation gateway through a router and configured to transmit the image data to the wireless presentation gateway; and
a portable device connected to the computer terminal through a universal serial bus (USB) port and configured to drive the computer terminal, the wireless presentation gateway, and the display device for performing an image display process automatically, the portable device comprising:
a memory configured to store driving data, the memory comprising:
a Wireless Fidelity (Wi-Fi) pairing folder having driving data of a Wi-Fi pairing executable program configured to establish a Wi-Fi direct link, the Wi-Fi pairing executable program generating a Wi-Fi pairing interface, and the Wi-Fi pairing interface comprising a Wi-Fi connection window, a Wi-Fi password window, and a device name window;
an auto-project detector program configured to identify the portable device after the auto-project detector program is installed into the computer terminal; and
a visitor green program configured to drive the computer terminal, the wireless presentation gateway, and the display device directly after the visitor green program is executed, the visitor green program being a zero-footprint program.

2. The projection system of claim 1, wherein the wireless presentation gateway is linked to the display device through a Wireless Fidelity (Wi-Fi) network.

3. The projection system of claim 1, wherein the display device is a projector, a monitor, or a display screen, and the computer terminal is a personal computer, a notebook, a tablet, or a work station.

* * * * *